Figure 1:
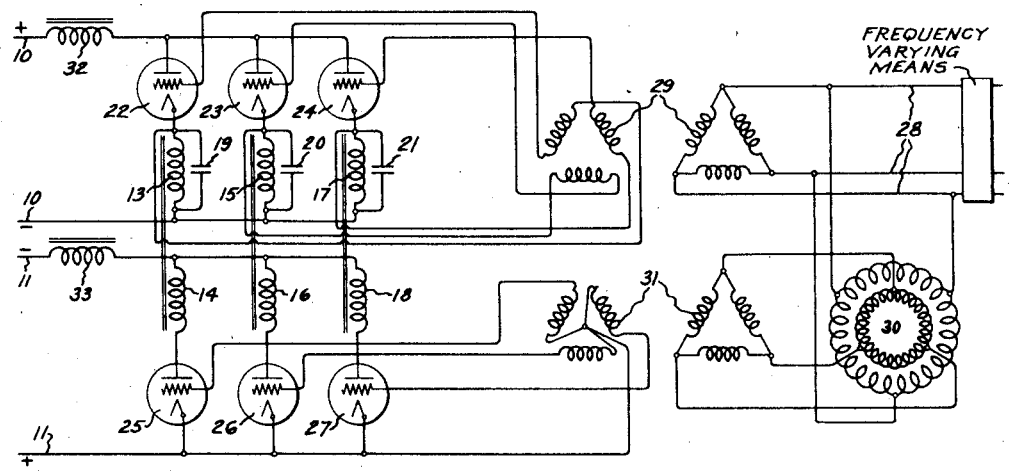

Oct. 5, 1937.  C. C. HERSKIND  2,094,792
ELECTRIC VALVE CONVERTING SYSTEM
Filed July 8, 1936 2 Sheets-Sheet 1

Inventor:
Carl C. Herskind,
by Harry E. Dunham
His Attorney.

Inventor:
Carl C. Herskind,
by Harry E. Dunham
His Attorney.

Patented Oct. 5, 1937

2,094,792

UNITED STATES PATENT OFFICE 2,094,792

ELECTRIC VALVE CONVERTING SYSTEM

Carl C. Herskind, Schenectady, N. Y., assignor to General Electric Company, a corporation of New York Application July 8, 1936, Serial No. 89,599

10 Claims. (Cl. 171—97)

My invention relates to electric valve converting systems and more particularly to such systems suitable for transmitting energy between direct current circuits or between direct and alternating current circuits one of which has a constant current characteristic.

An electric valve converting system suitable for transferring energy between direct current circuits or between direct and alternating current circuits one of which has a constant current characteristic is disclosed in U. S. Letters Patent No. 1,961,080, granted May 29, 1934 upon the application of C. A. Sabbah for improvements in an Electric valve converting system. This system utilizes an energy storage and transfer device comprising a multi-legged reactor provided with a single inductive winding on each leg thereof and having associated capacitors each connected across at least a portion of said inductive windings to maintain the total magnetomotive force of the core structure and that of each leg thereof substantially constant. The inductive windings of each leg are provided with intermediate terminals which are connected together through a polyphase alternating current network the neutral of which forms one side of a direct current output circuit. The other side of a direct current output circuit is common to one side of a direct current input circuit. In certain instances where the direct current potential appearing across the direct current input circuit is relatively high compared to the direct current potentials appearing across the constant current direct current output circuit, it will be desirable to provide two independent circuits.

It is, therefore, an object of my invention to provide an improved electric valve converting system for transferring energy between two direct current circuits which will overcome certain limitations of the arrangements of the prior art, and which will be simple and reliable in operation. It is a further object of my invention to provide an improved electric valve converting system for transmitting energy between direct current circuits or direct and alternating current circuits, one of which has a constant current characteristic, and each of which is independent from the other.

The novel features which I believe to be characteristic of my invention are set forth with particularity in the appended claims. My invention itself, however, both as to its organization and method of operation, together with further objects and advantages thereof, will be better understood by reference to the following description taken in connection with the accompanying drawings in which Fig. 1 shows an electric valve converting system embodying my invention which is suitable for transferring energy between direct current circuits, and Fig. 2 discloses a core structure utilized by the systems embodying my invention, Fig. 3 discloses an electric valve converting system suitable for transferring energy from a constant potential alternating current circuit to a constant current direct current circuit, and Fig. 4 discloses an electric valve converting system suitable for transferring energy from a constant potential direct current circuit to a constant current alternating current circuit.

Figure 2:
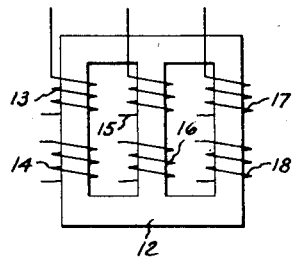

Referring now more particularly to Fig. 1 of the drawings, there is illustrated an arrangement embodying my invention for transferring energy between a constant potential direct current circuit 10 and a constant current direct current circuit 11. This system is provided with an energy storage and transfer device comprising a three-legged magnetic core structure 12 shown in detail in Fig. 2, and having a pair of inductive windings 13, 14; 15, 16; 17, 18; on each leg thereof, each pair of inductive windings being provided with energy storage devices which may be in the form of capacitors 19, 20 and 21. These capacitors 19, 20 and 21 may be connected in parallel with the inductive windings 13, 15 and 17 respectively, or at least across portions thereof so as to form energy storage circuits. One terminal of the windings 13, 15 and 17 is connected to one side of the direct current circuit 10 and the other terminal of each of these windings is connected respectively by means of the electric valves 22, 23 and 24 to the other side of the direct current circuit 10. One terminal of each of the inductive windings 14, 16 and 18 is connected to one side of the direct current circuit 11 and the other terminal of each of these windings is connected respectively by means of the electric valves 25, 26 and 27 to the other side of the direct current circuit 11. While each of the valves 22 to 27 is shown as being provided with an anode, a cathode and a control grid, these valves may be any of the several types well known in the art, although it is preferable to utilize valves of the type containing an ionizable medium and which are provided with a control or starting electrode whereby the discharge paths between the anodes and cathodes may be controlled. The control electrodes of the valves 22, 23 and 24 are energized from a suitable source of alternating potential 28 by means of a three-phase transformer 29, the secondary windings of which form part of the grid circuits of these valves. The alternating potential is preferably derived from a means provided with some means for readily varying the frequency of the alternating curent. The control electrodes of the valves 25, 26 and 27 are energized from the same source of alternating current 28 through a phase shifting device 30 and a three-phase transformer 31 the secondary windings of which are in the grid circuits of these valves. It will be apparent to those skilled in the art that each of the grid circuits of these valves may be provided with current limiting resistors as is common practice in the art. In order to prevent any interaction between the electric valve converting system and the direct current circuits, smoothing reactors 32 and 33 may be connected between the direct current circuits 10 and 11 and the valve apparatus. It will also be apparent to those skilled in the art that instead of connecting the capacitors 19, 20 and 21 across the inductvie windings 13, 15 and 17 other energy storage devices or circuits may be connected to the conductors to serve the same purpose.

In operation, neglecting the leakage reactance between windings common to each leg of the device 12, the windings and capacitors associated with the core structure thereof serve to maintain the total magnetomotive force in that of each of the legs of the magnetic core structure at a substantially constant value. Each of the electric valves 22 to 27 is conductive for 120 electrical degrees of each cycle, these valves becoming conductive in predetermined sequence at a frequency equal to that of the alternating current source 28, from which the control electrodes or grids are controlled. In order to operate this system properly, the phase relation between the grid excitation of these valves 22, 23 and 24 and the valves 25, 26 and 27 must be such that the valve in the lower group becomes conductive in advance of the corresponding valve of the upper group. This angle of advance between the excitation of the two corresponding valves, as for example between valves 22 and 25, will lie between any valve just greater than 0° and slightly less than 180°. The phase shifting device 30 provides the means for obtaining this phase difference and also operates as a control for determining the amount of energy transferred between the two direct current circuits. The voltage relation and power transfer relation between the two direct current circuits is dependent upon the ratio between the windings of each pair of windings on each leg of the core structure 12; the size of the capacitors connected across the windings 13, 15 and 17; the frequency of the alternating current potential applied upon the control electrodes of the discharge devices as derived from the alternating current source 28; and the phase relation between the excitation of the groups of control electrodes of the valves 22, 23, 24 and 25, 16, 27.

The function performed in the operation of the system by the three-legged core structure 12, the windings 13, 15, 17 and the associated capacitors 19, 20, 21 perhaps will be clarified by the following example of one cycle of operation of the electric valves 22, 25 associated with one leg of the core structure. If we assume, for example, that the grid excitation supplied to the control electrodes of the valves 22 and 25 differs by a phase difference of 120°, the valve 25 will be conductive for 120 electrical degrees and meanwhile the valve 22 will remain non-conductive. The capacitor 19 having been charged to a certain potential by previous operation, now discharges into the winding 13, so that by magnetic coupling with winding 14, energy is supplied to valve 25. At the end of the period of conductivity of the valve 25 the valve 22 becomes conductive and the valve 25 now remains nonconductive. Thus the current transmitted by the valve 22 serves to store energy in the capacitor 19 during the period of the conductivity of this valve. At the end of the period of the conductivity of the valve 22 the current is transferred from this valve to one of the other valves 23 or 24 and during the next 120 electrical degrees the valves 22 and 25 both remain nonconductive. During the period when both these valves are nonconductive the capacitor 19 discharges into the transformer winding 13 in order to maintain the required magnetomotive force on this transformer winding and in so doing it reverses its polarity so that it has the proper polarity to supply power to the anode of the valve 25 when this valve is again permitted to become conductive. From this it is believed that it will be apparent to those skilled in the art that the capacitors 19, 20 and 21 not only provide commutating potentials to cause the transfer of current between the valve means 22, 23 and 24 but also operate as energy storage devices to supply current to the anodes of the valves 25, 26 and 27. For purposes of explanation the operation of this system has been described as transferring energy from the constant potential direct current circuit 10 to the constant current direct current circuit 11, but it will be apparent that the energy transfer may occur in the opposite direction. It furthermore will also be apparent to those skilled in the art that by providing means for varying the frequency of the alternating current source 28 the transfer of energy between the two circuits may be readily controlled.

Figure 3:
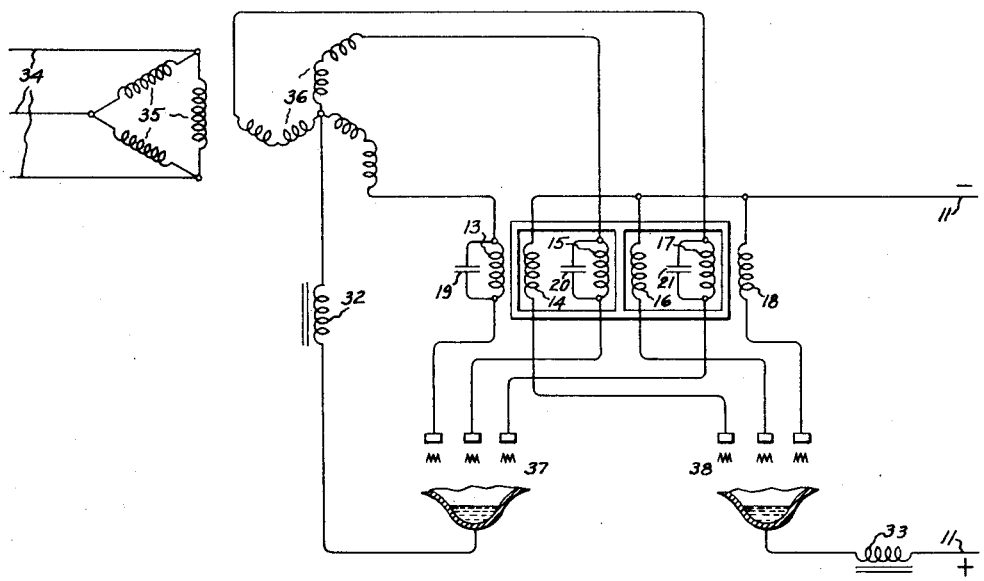

In Fig. 3 I disclose an electric valve converting system suitable for transferring energy from a constant potential alternating current circuit 34 to a constant current direct current circuit 11. Since this system utilizes apparatus which corresponds to certain elements of Fig. 1 and the operation thereof is similar, these elements have been given like reference characters. By means of a polyphase alternating current transformer having primary windings 35 and secondary windings 36, alternating potentials are impressed upon the windings 15, 16, 17 and their associated capacitors. The other extremities of the windings 15, 16 and 17 are each connected by means of one of the anodes of a multi-anode single-cathode electric valve 37 through the choke inductor 32 to the neutral points of the transformer winding 36. One extremity of each of the inductive windings 14, 16 and 18 is connected to the direct current circuit 11 while the other extremities of these windings are connected respectively by means of one of the anodes of a multi-anode, single-cathode electric valve 38 through the choke inductor 33 to the other side of the direct current circuit 11. While in this figure I have shown the use of a pair of multi-anode, single-cathode grid controlled electric discharge devices, I do not wish to be limited thereto since it will be obvious to those skilled in the art that any of the devices well known in the art may be utilized including the single electric discharge valve disclosed in connection with Fig. 1.

Figure 4:
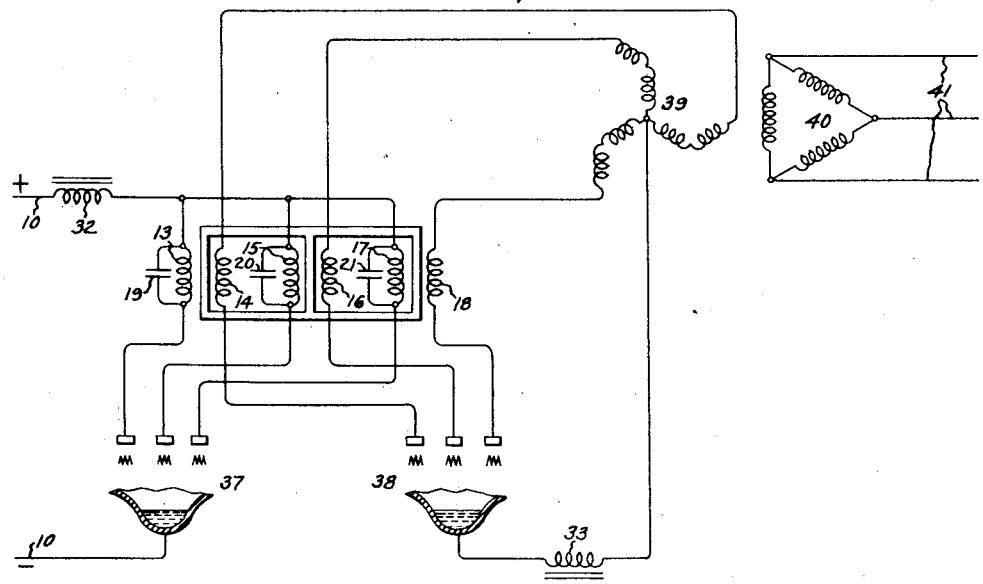

The arrangement disclosed in Fig. 4 is suitable for transferring energy from a constant potential direct current circuit to a constant current alternating current circuit. The upper extremity of the inductive windings 15, 16 and 17 and their associated capacitors are connected to one side of the direct current circuit to the inductor 32 and the remaining extremities of these windings are connected to the anodes of a multianode, single-cathode electric discharge valve 37 the cathode of which is connected to the other side of the direct current circuit 10. The upper extremities of the inductive windings 14, 16 and 18 are each connected to the outer terminals of the primary winding 39, the secondary 40 of which is connected to the constant current alternating current circuit 41. The lower extremities of the inductive windings 14, 16 and 18 are each connected to one of the anodes of the multianode, single-cathode electric discharge device 38, the cathode of which is connected through the inductor 33 to the neutral point of the transformer winding 39.

The control circuit for the electric discharge devices 37 and 38 disclosed in Figs. 3 and 4 may be the same as that disclosed in Fig. 1 and the operation of these systems is believed to be apparent to those skilled in the art since a detailed operation set forth in connection with Fig. 1 teaches all the principles of operation of the modifications shown in Figs. 3 and 4.

While I have shown and described my invention in connection with certain specific embodiments it will, of course, be understood that I do not wish to be limited thereto, since it is apparent that the principles herein disclosed are susceptible of numerous other applications, and modifications may be made in the circuit arrangements and in the instrumentalities employed without departing from the spirit and scope of my invention as set forth in the appended claims.

What I claim as new and desire to secure by Letters Patent of the United States, is:

1. An electric valve converting system for transferring energy between constant potential and constant current circuits comprising an $n$-legged core structure having a pair of windings on each leg, an energy storage device for each leg associated with one of the windings thereon, means including $n$ electric discharge valve means for interconnecting one of the windings on each leg with one of said circuits, means including $n$ electric discharge valve means for interconnecting the remaining windings with the other of said circuits, and means for controlling the conductivities of said valve means.

2. An electric valve converting system for transferring energy between a constant current circuit and a constant potential circuit comprising an $n$-legged core structure having a pair of windings on each leg, a capacitor for each leg and being connected in parallel with one winding thereon, means including electric discharge valve means for interconnecting one winding on each leg with one of said circuits, means including electric discharge valve means for interconnecting the remaining windings with the other of said circuits, and means for controlling the conductivities of said valve means.

3. An electric valve converting system for transferring energy between two independent circuits, one of which has a constant current characteristic, comprising a polyphase core structure having two groups of inductive windings, a plurality of energy storage devices associated with one group of said windings, means including a group of electric discharge valves for interconnecting the other group of windings to said constant current circuit, means including a group of electric discharge valves for interconnecting said windings associated with said energy storage devices to said other circuit, and means for controlling the sequence of the conductivity of said valve.

4. A system for transmitting energy between a constant potential circuit and a constant current circuit comprising a polyphase core structure having two groups of inductive windings, means including electric discharge valve means interconnecting one group of windings with said constant potential circuit, a capacitor for each winding of one of said groups for maintaining a substantially constant magnetomotive force in said structure, means including electric discharge valve means interconnecting the other group of windings with said constant current circuit, and means for controlling the conductivity of said valve means.

5. An electric valve converting system for transmitting energy between two independent circuits, one of which has a constant current characteristic comprising an $n$-legged core structure provided with two windings on each leg thereof, a capacitor for each leg, each capacitor being connected to one of said windings to maintain a substantially constant magnetomotive force in said structure, a plurality of electric discharge valve means each connected to a different winding, one of the windings on each leg of said structure and its associated valve means being connected to one of said circuits, the remaining valve means and associated windings being connected to the other of said circuits, means for controlling the conductivities of said valve means, and means for shifting the instant of conductivity of each of the valve means connected to one of said circuits with respect to the remaining valve means to control the transfer of energy between said circuits.

6. An electric valve converting system for transferring energy between two independent circuits, one of which has a constant current characteristic, comprising a polyphase core structure having two groups of inductive windings, a plurality of energy storage devices associated with one group of said windings, means including a group of electric discharge valve means for interconnecting the other group of windings to said constant current circuit, means including a group of electric discharge valve means for interconnecting said windings associated with said energy storage devices to said other circuit, and means for controlling the sequence and the frequency of the conductivity of said valve means.

7. An electric valve converting system for transferring energy between constant potential and constant current circuits comprising an $n$-legged core structure having a pair of windings on each leg, an energy storage device for each leg associated with one of the windings thereon, means including $n$ electric discharge valves for interconnecting one of the windings on each leg with one of said circuits, means including $n$ electric discharge valves for interconnecting the remaining windings with the other of said circuits, and means for controlling the frequency of the conductivities of said valves.

8. A system for transmitting energy between a source of constant potential circuit and a constant current circuit comprising a polyphase core structure having two groups of inductive windings thereon, electric discharge valve means interconnecting one group of windings with said constant potential circuit, a capacitor for each winding of said group for maintaining a substantially constant magneto-motive force in said structure, electric discharge valve means interconnecting the other group of windings with said constant current circuit, and means for controlling the frequency of conductivity of said valve means.

9. An electric valve converting system for transferring energy between constant current and constant potential circuits comprising an $n$-legged core structure having a pair of windings on each leg, a capacitor for each leg and being connected in parallel with one winding thereon, means including electric valve means interconnecting said windings and capacitors with one of said circuits, means including electric valve means for interconnecting the remaining windings with the other of said circuits, means for controlling the conductivities of said valve means so that with respect to each leg of said device the valve means interconnecting said latter windings becomes conductive prior to the valve means interconnecting said other winding and capacitor with said circuits, and means for controlling the frequency of the conductivities of said valve means.

10. An electric valve converting system for transmitting energy between two independent circuits, one of which has a constant current characteristic comprising an $n$-legged core structure provided with two windings on each leg thereof, a capacitor for each leg, each capacitor being connected to one of said windings to maintain a substantially constant magnetomotive force in said structure, an electric discharge valve means connected to each winding and associated capacitor, means connecting said valve means and winding to one of said circuits, an electric discharge valve means connected to each of the remaining windings, means connecting said valve means and said windings to said circuits having a constant current characteristic, means for controlling the conductivities of said valve means so that with respect to each leg of said structure said latter valve means becomes conductive prior to the valve means which is associated with the winding having a capacitor connected thereto, and means for shifting the instant of conductivity of each of the valve means connected to one of said circuits to control the transfer of energy between said circuits.

CARL C. HERSKIND.

CERTIFICATE OF CORRECTION.

Patent No. 2,094,792.　　　　　　　　　　　　October 5, 1937.

CARL C. HERSKIND.

It is hereby certified that error appears in the printed specification of the above numbered patent requiring correction as follows: Page 2, first column, line 20, for "inductvie" read inductive; line 44, for "valve" read value; line 62, for the numeral "16" read 26; and that the said Letters Patent should be read with these corrections therein that the same may conform to the record of the case in the Patent Office.

Signed and sealed this 16th day of November, A. D. 1937.

Henry Van Arsdale,
Acting Commissioner of Patents.

(Seal)